United States Patent [19]

Simson

[11] Patent Number: 5,054,900

[45] Date of Patent: Oct. 8, 1991

[54] PANORAMIC REARVIEW MIRROR WITH NARROW ELONGATED REFLECTIVE PANELS

[76] Inventor: Anton K. Simson, 13227 Aubrey St., Poway, Calif. 92064

[21] Appl. No.: 553,983

[22] Filed: Jul. 17, 1990

Related U.S. Application Data

[63] Continuation of Ser. No. 380,374, Jul. 17, 1989, abandoned.

[51] Int. Cl.$^5$ .......................... G02B 5/08; G02B 7/18; G02F 1/13
[52] U.S. Cl. ................................. 359/851; 359/871; 359/604
[58] Field of Search ............ 350/613, 627, 616, 612, 350/630, 631, 601, 602, 278, 279

[56] References Cited

U.S. PATENT DOCUMENTS

| | | | |
|---|---|---|---|
| 2,573,812 | 11/1951 | Schroeder | 350/613 |
| 2,953,062 | 9/1960 | Simson | 350/613 |
| 3,806,232 | 4/1974 | Gray | 350/613 |
| 3,806,233 | 4/1974 | Stefano | 350/613 |
| 3,861,785 | 11/1975 | Barbour | 350/613 |
| 4,630,905 | 12/1986 | Blom | 350/613 |

*Primary Examiner*—Jon W. Henry
*Attorney, Agent, or Firm*—Henri J. A. Charmasson

[57] ABSTRACT

A grated thin-film surface forms a plurality of successive narrow silvered planes which are oriented to provide a composite and linear mirror. The thin film can be mounted against the inside upper section of a vehicle windshield, or sandwiched between the plies of a laminated windshield. The reflective surface is covered with a layer of liquid crystal of which the opacity can be electrically adjusted.

10 Claims, 2 Drawing Sheets

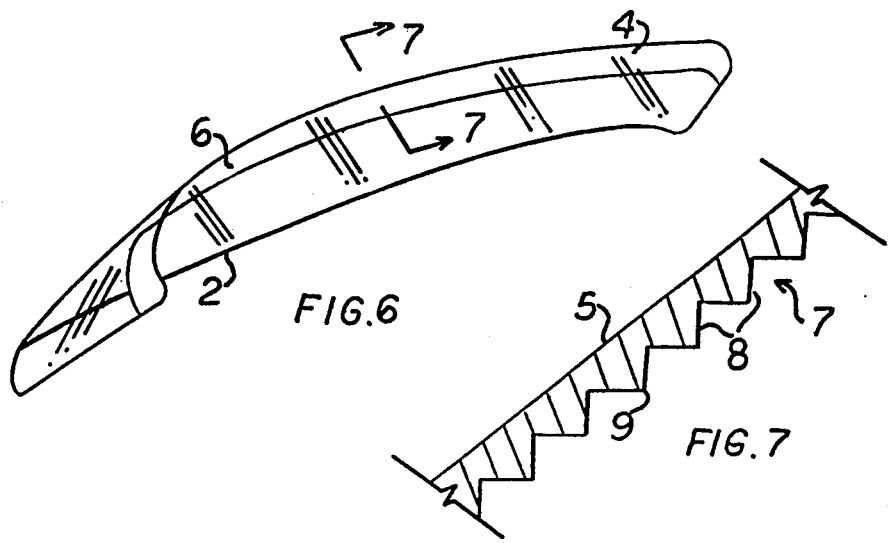
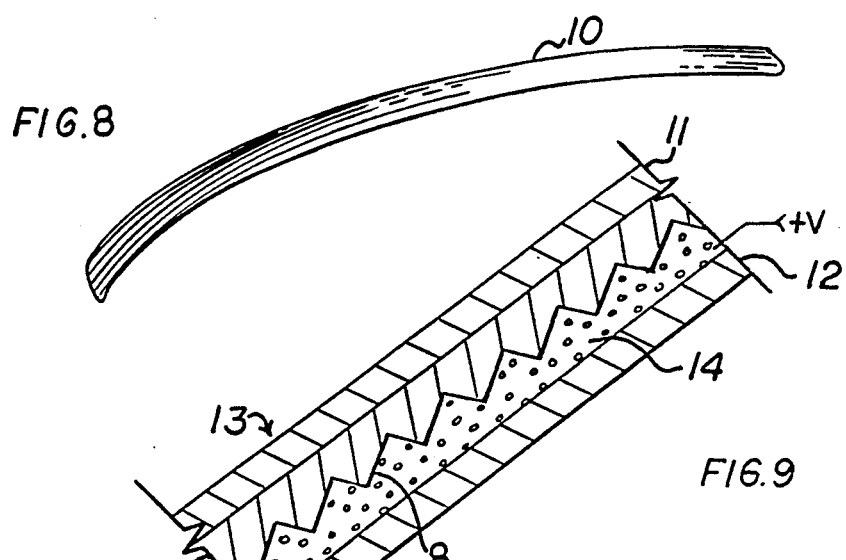
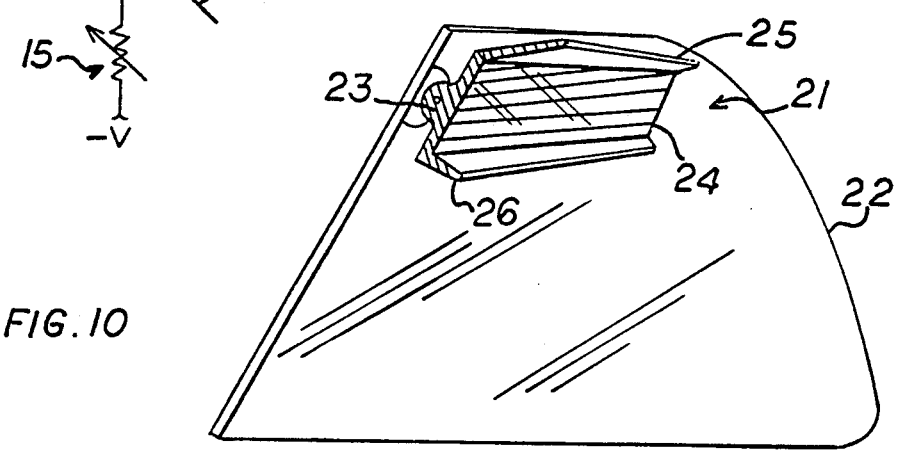

PANORAMIC REARVIEW MIRROR WITH NARROW ELONGATED REFLECTIVE PANELS

This is continuation application of pending prior application, Ser. No. 07/380,374 filed on July 17, 1989 for a panoramic rearview mirror, now abandoned.

FIELD OF THE INVENTION

The invention relates to panoramic rearview mirrors, and to the design requirements for the fabrication of grated optical surfaces.

BACKGROUND OF THE INVENTION

The common rearview mirror of an automotive vehicle is composed of a single piece of silvered glass or plexiglass approximately 5×25 centimeters in size. It is mounted near the center of the inner top section of the windshield as illustrated in FIG. 1. The plane of the mirror is oriented in a generally vertical position or is slightly tilted downward by a small pitch angle, and is rotated toward the driver. The angle of rotation or yaw angle, as measured from a vector normal to the mirror surface, is approximately 20 degrees with the vehicle axis of travel. The driver's eyes are approximately 60 centimeters from the mirror which yields a viewing angle of 10 to 20 degrees toward the rear of the vehicle.

To expand this viewing angle, a number of approaches have been tried. The simplest approach is for the driver to move his head from side to side to expand the total viewing angle. This yields only a limited increase in coverage and is a slow an tiring process. Outside rear view mirrors may be used to provide additional lateral coverage. This approach produces a variety of different unrelated views separated by blind spots.

A broader, continuous, viewing angle can only be obtained by increasing the size of the mirror. Wider inside mirrors can be used, but are limited to only a few additional centimeters in width and a correspondingly small increased in viewing angle. The confines of a vehicle limit the length of a planar mirror. A long, linear mirror would have to project forward through the windshield and back into the passenger compartment.

The mirror can be segmented into several independent mirror sections aligned along the top inner edge of the windshield to produce a wide angle view. This approach yields a wide field of vision, but requires a relatively large and bulky assembly, and produces confusing discontinuities as the view shifts from one mirror section to the other.

Convex mirrors expand the viewing angle and avoid the discontinuities, but produce substantial distortion of the reflected objects and misleading perception of their distances to the vehicle.

SUMMARY OF THE INVENTION

The principal and secondary objects of the invention are to provide a wide angle, distortion-free rearview for an automotive vehicle which can be incorporated directly onto or near the surface or between the plies of the windshield.

This is accomplished by forming a mirror that consists of a large number of extremely narrow elongated mirrors or micro grooves whose reflecting surfaces are all aligned in the same direction as a conventional rearview mirror and whose axes lies on the lines of the local intersection of the mirror and the windshield.

BRIEF DESCRIPTION OF THE DRAWING

FIG. 6 is a diagrammatical perspective view of a windshield equipped with the reflective device;

FIG. 7 is a partial, enlarged cross-sectional view taken along line 7—7 of FIG. 6;

FIG. 8 is a perspective view of a thin film;

FIG. 9 is a partial, enlarged cross-sectional view of a second embodiment of the invention; and FIG. 10 is a partial, enlarged cross-sectional view of a third embodiment of the invention;

DESCRIPTION OF THE PREFERRED EMBODIMENT OF THE INVENTION

Figure 1:
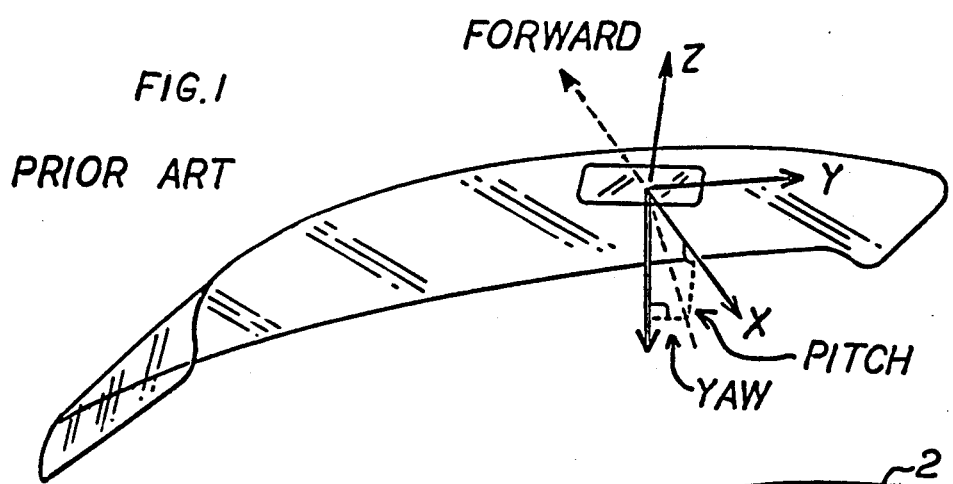
FIG. 1 is a diagrammatical perspective view of a windshield with a prior art rearview mirror attached. This figure also displays the reference coordinate system and typical mirror alignments.

Referring now to the drawing, the construction of the preferred embodiment of the invention will be explained with reference to diagrammatical illustrations of FIGS. 2-9

Figure 2:
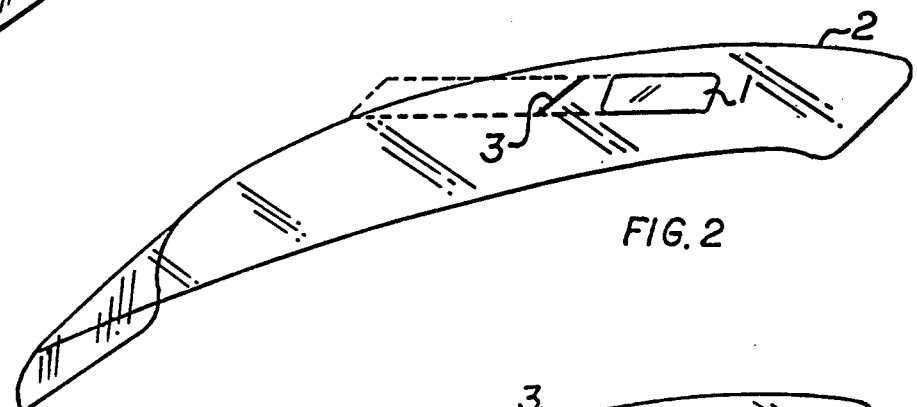
FIG. 2 is a diagrammatical perspective view of the line of intersection of the plane of a mirror and windshield.

To better explain the invention, let us consider that a conventional rearview mirror 1 of FIG. 2 has a planar surface and is oriented at an angle to the generally planar surface of the windshield 2, as previously explained in reference to FIG. 1 of the prior art. The mirror 1 is typically twisted toward the driver of a vehicle at a yaw angle of about 20 degrees in reference to the axis of travel. The mirror is also tilted downward at a pitch angle of about 10 degrees in order to provide the most desirable rearview scope to the operator of the vehicle.

It is possible to specifically define the intersection of the two planar surfaces of the mirror and the windshield. This line of intersection, and only this line of intersection, contains the locus of points where a linear segment of the mirror can be constructed which will reflect in the direction of the conventional mirror and lie on the surface of the windshield. This intersection is a line 3 that generally runs diagonally across the surface of the windshield from the upper right to the lower left.

Figure 3:
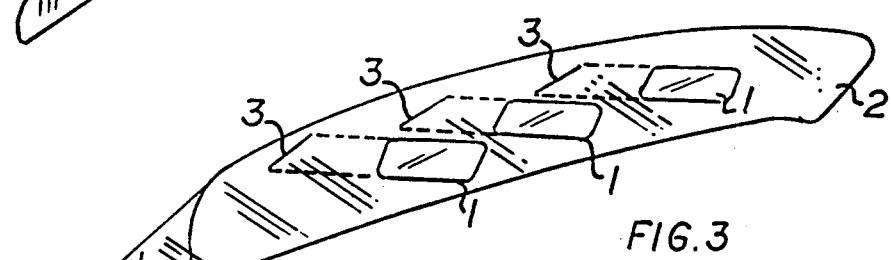
FIG. 3 is a diagrammatical perspective view of the successive lines of intersection of the plane of the mirror and windshield as the mirror is displaced across the windshield.
Figure 4:
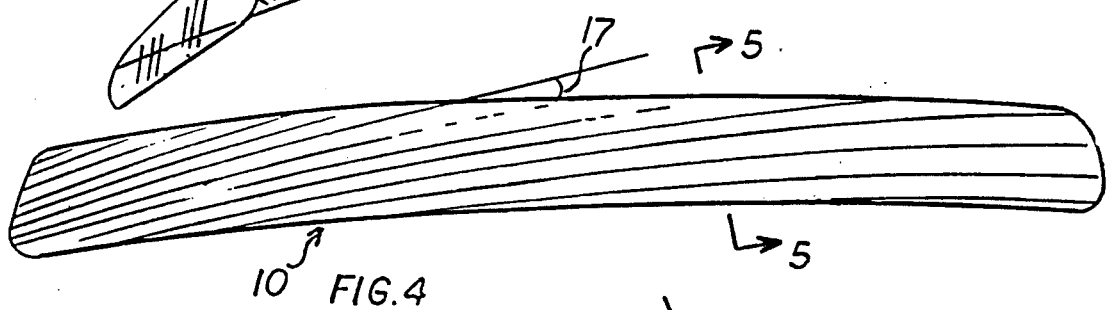
FIG. 4 is an illustration of the lines of intersection of the plane of the mirror and the windshield.
Figure 5:
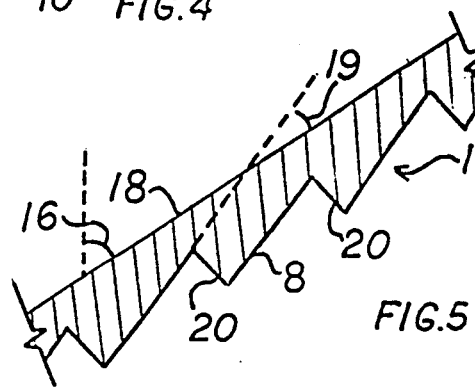
FIG. 5 is an illustration of the mirror angle taken along line 5—5 of FIG. 4.

As shown in FIG. 3, if the rearview mirror 1 is successively moved across the windshield 2 while its planar orientation is held constant, a series of diagonal lines of the intersection 3 are produced. If the windshield is a flat plane, the lines of intersection will be straight and parallel. For a conventional curved windshield, the lines of intersection will be slightly curved, and will form a relatively small angle (10 to 15 degrees) at the right end of the windshield and will gradually increase to larger angles (25 to 35 degrees) at the left end of the windshield as shown in FIGS. 4 and 5.

If the dimensions of the planar surface of a rearview mirror are reduced so that its width lies between 100 and 500 micrometers, and its length is oriented along the line of intersection of the mirror and the windshield, and a large number of these mirrors are combined and so oriented, as in a series of micro grooves, a total reflecting surface can be produced that lies on the surface of the windshield and results in a panoramic rearview mirror.

This mirror produces a continuous, essentially distortion free view of the complete 180 sector behind the drive.

As shown in FIGS. 6 and 7, the afore-mentioned projection of composite segments of an imaginary, stretched rearview mirror over the upper portion of a vehicle windshield 2 is accomplished by means of a grated substrate 4. The substrate has a smooth outer face 5 with a shape congruent with the inner surface of the upper section of the windshield 2. The inner face 7 of the substrate is grated to form a plurality of successive, generally parallel, narrow, elongated panels or lines 8 which are covered with a reflective lining 9. The windshield 2 may have a generally frustro-conical shape and be slanted downwardly and forwardly at a pitch angle of about −50 degrees. Since the pitch angle of a rearview mirror is approximately 5 to 10 degrees, the surface of each panel 8 in reference to the underlying surface of the windshield forms an angle which varies from about 45 to 50 degrees. Since the width of each panel is kept between 100 and 500 micrometers the thickness of the substrate can be within or close to that range of dimensions. Accordingly, the preferred embodiment of the invention is a thin film 10 illustrated in FIG. 8, made of flexible material which may be bonded to the inner surface of section 4 of the windshield. In an alternate embodiment, the thin film 10 is sandwiched between two plies 11 and 12 of a laminated windshield 13. A tinted transparent layer of material 14 such as liquid crystal can be layered between the thin film lo and the innermost ply of the windshield. The reflectivity of the device can then be adjusted by controlling the opacity of the liquid crystal layer 14 by electrical means 15 as shown in FIG. 9. The grating of the inner face of the thin film comprises a series of successive near-parallel panels or lines 8 which have a constant width of between 100 to 500 micrometers. The panels run in a generally diagonal direction across the inner face of the thin film, the exact direction being dependent upon the underlying geometry of the windshield, the windshield pitch angle, and the desired mirror angle.

The position of each panel can be determined by calculating the position of an intersecting line 3 between the actual windshield and a plane having the orientation of the virtual stretched mirror 1. Due to the frustro-conical general shape of the windshield, the intersecting lines 3 corresponding to those various panels run diagonally and not exactly parallel. The degree of slant or yaw angle in reference to the horizon decreases as one moves away from the general area occupied by the operator of the vehicle assumed to be setting on the left side of the vehicle, as illustrated in FIGS. 4. The pitch angle of each panel 8 in reference to the back plane or forward face 18 of the thin film 10 is given by the difference between the pitch of the virtual mirror 1 and the pitch 16 of the underlying portion of the windshield. The grating parameters for the thin film are thus fully defined by an intersecting or yaw angle 17 and a mirror or pitch angle 19 for each panel 8. If the windshield has a more complex geometry such as a vertical curvature in addition to the customary horizontal curvature, then the variation of the windshield pitch across its width may have to be taken into account to avoid excessive distortion.

Table 1 lists the intersection angles and mirror angles for a succession of panels spanning the entire 120 centimeter span of a typical windshield. Typical panel data are provided at intervals of approximately 5.08 centimeters. In this model the general radius of the windshield was 4.5 meters with a pitch angle of −50 degrees. The virtual mirror was assumed to have a pitch angle of −10 degrees and a yaw angle of −20 degrees. The median point of each panel is given in reference to the center of the windshield. The distance to the chord joining the two ends of the windshield is also given.

TABLE 1

| WINDSHIELD REFLECTING SECTION PANEL LOCATION (CENTIMETERS) | | | | INTERCEPTING MIRROR | |
|---|---|---|---|---|---|
| To/From Center | To Chord | Yaw Angle | | ANGLE | ANGLE |
| −60.96 | 4.907 | 9.21 | LEFT | 30.50 | 48.04 |
| −55.88 | 4.119 | 8.43 | | 29.84 | 47.65 |
| −50.90 | 3.40 | 7.66 | | 29.17 | 47.27 |
| −45.72 | 2.753 | 6.89 | | 28.50 | 46.91 |
| −40.64 | 2.174 | 6.12 | | 27.82 | 46.54 |
| −35.56 | 1.664 | 5.36 | | 27.14 | 46.19 |
| −30.48 | 1.222 | 4.59 | | 26.45 | 45.85 |
| −25.40 | .85 | 3.82 | | 25.75 | 45.51 |
| −20.32 | .541 | 3.06 | | 25.05 | 45.18 |
| −15.24 | .304 | 2.29 | | 24.34 | 44.86 |
| −10.16 | .134 | 1.53 | | 23.63 | 44.55 |
| −5.08 | .033 | 0.76 | | 22.91 | 44.25 |
| 0.00 | 0.00 | 0.00 | CENTER | 22.18 | 43.96 |
| 5.08 | .033 | −0.76 | | 21.44 | 43.67 |
| 10.16 | .134 | −1.53 | | 20.69 | 43.40 |
| 15.24 | .304 | −2.29 | | 19.94 | 43.13 |
| 20.32 | .541 | −3.06 | | 19.18 | 42.88 |
| 25.40 | .85 | −3.82 | | 18.41 | 42.63 |
| 30.48 | 1.222 | −4.59 | | 17.63 | 42.40 |
| 35.58 | 1.664 | −5.36 | | 16.64 | 42.17 |
| 40.64 | 2.174 | −6.12 | | 16.04 | 41.95 |
| 45.72 | 2.755 | −6.89 | | 15.23 | 41.75 |
| 50.80 | 3.40 | −7.66 | | 14.41 | 41.55 |
| 55.88 | 4.119 | −8.43 | | 13.58 | 41.37 |
| 60.96 | 4.907 | −9.21 | RIGHT | 12.74 | 41.19 |

The reflective coating 9 may be applied to the entire grated inner face of the thin film. In an alternate embodiment, the small ledges 20 which are formed between each panel may be left uncovered and transparent to allow light to come at a high incident angle through the windshield and through this unobstructed areas of the thin film.

FIG. 10 illustrates a third embodiment of the invention which consists of an elongated mirror 21, mounted in a conventional manner against the inner upper portion of a windshield 22. The mirror has a back-plane 23 which generally follows the curvature of the upper section of the windshield. Over that back plane is bonded a grated thin film 24 as described earlier. The mirror 21 is provided with a first shade 25 along its upper edge, and a second thinner shade 26 along its lower edge.

While the preferred embodiment of the invention has been described in connection with the fabrication of an automotive vehicle windshield, other embodiments may be devised in connection with the same or other applications without departing from the spirit of the invention and the scope of the appended claims.

What is claimed is:

1. In combination with a vehicle windshield having generally parallel front and back faces, a reflective device designed to provide a wide scope rearview to an operator of the vehicle, said device comprising:

a thin grated substrate having an outer face in contact and congruent with a section of the windshield, and an inner face defining a succession of narrow, elongated reflective panels wherein said panels are oriented to present a composite but linearly reflective surface to light rays emanating from a point in space located inwardly from said windshield;

the inner faces of each of said panels being flat, reflective and forming varying angles with the outer face of the substrate.

2. The combination claimed in claim 1, wherein said windshield has a generally arcuate shape slanting downwardly and forwardly.

3. The combination claimed in claim 2, wherein said section forms a strip extending horizontally across an upper part of the windshield.

4. The combination claimed in claim 3, wherein each of said panels lies in a plane defined by a first angle with the horizon and by a second angle with the outer face of the substrate, the first and second angles of the successive panels varying from panel to panel across the span of said section to accommodate the slant and radius of a portion of the windshield underlying each of said panels.

5. The combination claimed in claim 4, wherein said substrate is a thin film, and the width of each of said panels falls between 100 and 500 micrometers.

6. The combination claimed in claim 5, wherein said thin film is applied to the inner face of the windshield.

7. The combination claimed in claim 5, wherein said windshield is made of several laminated plies of glass, and said grated substrate is sandwiched between two of said plies.

8. The combination claimed in claim 5, wherein said windshield comprises a layer of tinted material over said grated surface.

9. The combination claimed in claim 8, wherein said device comprises means for adjusting the tint of said material.

10. The combination claimed in claim 4, wherein the positions of successive lines separating said panels correspond to the intersections of a plurality of successive, parallel, adjacent and uniformly spaced-apart planes with said section of the windshield, wherein the pitch and yaw angles of said planes are similar to the pitch and yaw of said rearview mirror, and the mirror angle of each of said panels is equal to the difference between the pitch angle of said mirror and the pitch angle of the section of the windshield underlying said panel.

* * * * *